United States Patent
Pless (10) Patent No.: US 8,354,010 B2
(45) Date of Patent: Jan. 15, 2013

(54) ELECTROLYTIC CELL WITH CAVITATING JET

(76) Inventor: Benjamin Pless, Atherton, CA (US)

( * ) Notice: Subject to any disclaimer, the term of this patent is extended or adjusted under 35 U.S.C. 154(b) by 648 days.

(21) Appl. No.: 12/296,526

(22) PCT Filed: Apr. 20, 2007

(86) PCT No.: PCT/US2007/067124
§ 371 (c)(1),
(2), (4) Date: Dec. 17, 2009

(87) PCT Pub. No.: WO2007/124443
PCT Pub. Date: Nov. 1, 2007

(65) Prior Publication Data
US 2010/0101942 A1  Apr. 29, 2010

Related U.S. Application Data

(60) Provisional application No. 60/793,545, filed on Apr. 20, 2006, provisional application No. 60/813,780, filed on Jun. 14, 2006.

(51) Int. Cl.
*C25B 9/06* (2006.01)
*C25B 1/04* (2006.01)

(52) U.S. Cl. ........ 204/261; 204/237; 204/263; 204/273; 205/628

(58) Field of Classification Search ........................ None
See application file for complete search history.

(56) References Cited

U.S. PATENT DOCUMENTS

| | | |
|---|---|---|
| 4,333,796 A | 6/1982 | Flynn |
| 4,343,690 A * | 8/1982 | de Nora .................. 204/263 |
| 4,563,341 A | 1/1986 | Flynn |
| 5,097,802 A | 3/1992 | Clawson |
| 5,125,582 A | 6/1992 | Surjaatmadja et al. |
| 5,239,948 A | 8/1993 | Sajewski |
| 5,659,173 A | 8/1997 | Putterman et al. |
| 5,735,235 A | 4/1998 | Li |
| 5,968,323 A | 10/1999 | Pless |
| 6,200,486 B1 | 3/2001 | Chahine et al. |
| 6,404,983 B1 | 6/2002 | Gruzdev et al. |
| 6,627,784 B2 | 9/2003 | Hudson et al. |

(Continued)

FOREIGN PATENT DOCUMENTS

WO   2007127616 A   11/2007

OTHER PUBLICATIONS

Crum, Lawrence A. "Acoustically induced cavitation fusion", *J. Acoust. Soc. Am.* vol. 103, Issue 5, pp. 3012-3012 (May 1998).

(Continued)

*Primary Examiner* — Harry D Wilkins, III
(74) *Attorney, Agent, or Firm* — Jeffrey Schox (57) ABSTRACT

The electrolytic cell of the preferred embodiment includes an electrode pair and a cavitating jet. The electrode pair includes a cathode electrode and an anode electrode and defines an electrical path between the cathode electrode and the anode electrode. The cavitating jet, which is located along the electrical path between the cathode electrode and the anode electrode, functions to cavitate a fluid, such as water. The electrode pair and the cavitating jet cooperate to initiate a plasma state in the water. The water in the plasma state acts a virtual electrode with a higher current density than the cathode electrode and/or anode electrode. The plasma virtual electrode, through thermolysis and/or electrolysis, produces hydrogen.

28 Claims, 2 Drawing Sheets

U.S. PATENT DOCUMENTS

| | | | |
|---|---|---|---|
| 6,910,448 | B2 | 6/2005 | Thoma |
| 6,938,582 | B2 | 9/2005 | Shin |
| 7,704,401 | B2 * | 4/2010 | Ike et al. .................. 210/748.15 |
| 7,771,582 | B2 * | 8/2010 | Kazem .......................... 205/687 |
| 2002/0090047 | A1 | 7/2002 | Stringham |
| 2006/0060464 | A1 | 3/2006 | Chang |
| 2006/0126428 | A1 | 6/2006 | Hudson et al. |
| 2010/0012049 | A1 | 1/2010 | Pless |

OTHER PUBLICATIONS

Cleveland et al. "Effect of Overpressure on Dissolution and Cavitation of Bubbles Stabilized on a Metal Surface", *J. Acoust. Soc. Am.* vol. 103, Issue 5, pp. 3038-3038 (May 1998).

Gordeychuk, et al. "The Effect of Hydrostatic Pressure on Sonoluminescence of Metal Salts Solutions", *CP1022, Nonlinear Acoustics—Fundamentals and Applications (ISNA 18),* 18$^{th}$ *International Symposium,* 2008, pp. 201-204.

Miles, et al. "Anomalous Effects in Deuterated Systems", *NEN,* vol. 4, No. 7, Nov. 1996, pp. 4-5.

Putterman, Seth J. "Sonoluminescence: Sound into Light", *Scientific American,* Feb. 1995, pp. 32-37.

Suslick et al. "Hot Spot Conditions During Multi-Bubble Cavitation", *Sonochemistry and Sonoluminescence,* Crum, L.A.; Mason, T.J.; Reisse, J.;Suslick, K.S., eds. Kluwer Publishers: Dordrecht, Netherlands, 1999, pp. 191-204.

Didenko, et al. "Effect of Noble Gases on Sonoluminescence Temperatures during Multibubble Cavitation", *Physical Review Letters,* vol. 84, No. 4, Jan. 24, 2000, pp. 777-780.

Chaffin, et al. "Hydrogen Production by Plasma Electrolysis", *Journal of Energy Engineering,* vol. 132, Issue 3, pp. 104-108 (Dec. 2006).

\* cited by examiner

ELECTROLYTIC CELL WITH CAVITATING JET

CROSS-REFERENCE TO RELATED APPLICATIONS

This application also claims the benefit of U.S. Provisional Application No. 60/793,545 entitled "Cavitating Jet Plasma Electrolysis" and filed on 20 Apr. 2006 and U.S. Provisional Application No. 60/813,780 entitled "Plasma Hydrogen Generator" and filed on 14 Jun. 2006, which are both incorporated in their entirety by this reference.

TECHNICAL FIELD

This invention relates generally to the electrolysis field, and more specifically to a new and useful electrolytic cell with a cavitating jet.

BACKGROUND

The use of hydrogen in the automotive and consumer good industries has been recently explored for direct combustion in internal combustion engines and as a fuel in proton exchange membrane fuel cells. The use may reduce dependence on foreign hydrocarbon sources and may reduce greenhouse gas emissions. There is concern, however, about the energy-consuming process of hydrogen production. Manufacturing hydrogen requires a hydrogen carrier such as a fossil fuel or water. The former consumes the fossil resource and produces carbon dioxide, while the latter (known as electrolysis) requires electricity. If the efficiency of the electrolysis process was increased, then the possibility of using a cleaner fuel, such as wind or solar power, may be explored.

Thus, there is a need in the electrolysis field to create a new and useful electrolytic cell with increased efficiency. This invention provides such new and useful electrolytic cell.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Electrolytic Cell

Figure 1:
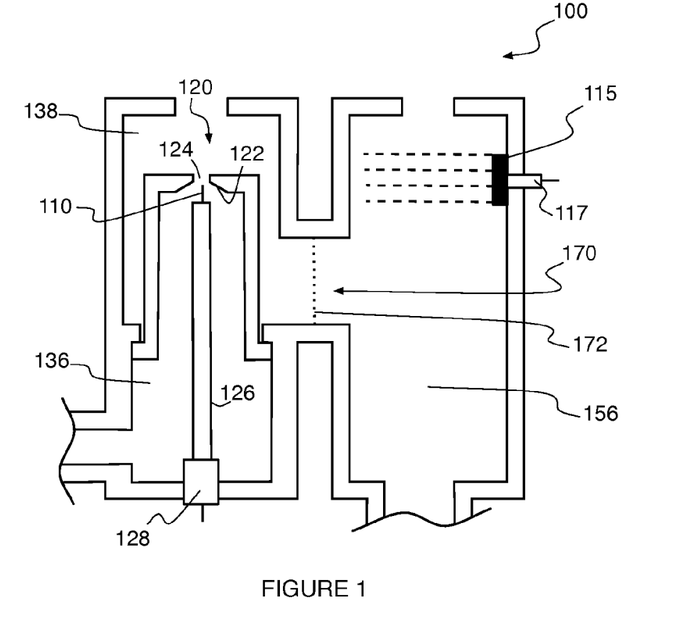
FIG. 1 is a representation of the electrolytic cell with a first version of the cathode electrode, a first version of the anode, and a cavitating jet.

As shown in FIG. 1, the electrolytic cell 100 of the preferred embodiment includes an electrode pair 110 and 115 and a cavitating jet 120. The electrode pair includes a cathode electrode no and an anode electrode 115 and establishes an electrical path between the cathode electrode no and the anode electrode 115. The cavitating jet 120, which is located along the electrical path between the cathode electrode 110 and the anode electrode 115, functions to cavitate a fluid, such as water. The electrode pair 110 and 115 and the cavitating jet 120 cooperate to initiate a plasma state in the fluid. The plasma acts as a virtual electrode with a higher current density than the cathode electrode no and/or anode electrode 115. The plasma virtual electrode, through thermolysis and/or electrolysis, can produce hydrogen and other gases. The plasma virtual electrode may, however, be used in other suitable chemical reactions, such as hydrolysis, or may be used to create a high-energy environment for the promotion of chemical reactions, the promotion of nuclear reactions, the creation of fine powders, and the sterilization of fluids.

The electrode pair of the preferred embodiment includes a cathode electrode 110 and an anode electrode 115 and establishes an electrical path between the cathode electrode 110 and the anode electrode 115. The electrode pair 110 and 115 functions to cause electrolysis in an ionic solution, such as salt water or acidic water, and produce hydrogen and oxygen in a gaseous state. In other variations, the fluid may be an oil or other fluid containing hydrocarbons. The electrolytic cell 100 is activated by applying an electrical potential across the anode electrode 115 and the cathode electrode no. Typical operating parameters are in the range of approximately 200 to 800 volts and approximately 0.05 and 0.80 amps but much higher values are possible depending on the specifics of the system in use. The electrical current is preferably continuous, but pulsed currents may be used.

The cavitating jet 120 of the preferred embodiment, which is located along the electrical path between the cathode electrode no and the anode electrode 115, functions to cavitate the fluid. The cavitating jet 120 preferably includes a throat 122 and a nozzle 124. The throat 122 and the nozzle 124 cooperate to receive the fluid and to increase the velocity of the fluid. Many different geometries for the transition from the throat to the nozzle may be used, but the preferred geometry is a linear taper. The diameter of the nozzle 124 is preferably one sixteenth of an inch, while the diameter of the throat 122 is one and a half inches. The cavitating jet 120 may, however, include other geometries and dimensions, such as the cavitating jets disclosed in U.S. Pat. No. 5,125,582 entitled "Surge Enhanced Cavitating Jet" and issued to Surjaatmadja on 30 Jun. 1992 and U.S. Pat. No. 6,200,486 entitled "Fluid Jet Cavitation Method and System for Efficient Decontamination of Liquids" and issued to Chahine on 13 Mar. 2001, which are both incorporated in their entirety by this reference. While the electrolytic cell 100 of the preferred embodiment only includes one cavitating jet, the electrolytic cell 100 of alternative embodiments may include more than one cavitating jet acting (preferably in a parallel arrangement).

Cavitation is the formation of bubbles within a fluid when that fluid reaches its vapor pressure. In some ways, cavitation is similar to boiling. The major difference between the two is the thermodynamic paths that precede the formation of the vapor. Boiling occurs when the local vapor pressure of the liquid rises above its local ambient pressure and sufficient energy is present to cause the phase change to a gas. Cavitation inception occurs when the local pressure falls sufficiently far below the saturated vapor pressure, a value given by the tensile strength of the liquid. Cavitation inception can occur, for example, in the nozzle of the cavitating jet 120, behind the blade of an impellor, or through the shearing of a fluid as one portion rapidly passes another portion. Since cavitation bubbles have a relatively low gas pressure, the bubble will collapse in the presence of a higher pressure in the surrounding fluid. As the bubble collapses, the pressure and temperature of the vapor within the bubble will increase. The bubble will eventually collapse to a minute fraction of its original size, at which point the gas within dissipates into the surrounding liquid via a rather violent energy release. At the point of total collapse, the temperature of the vapor within the bubble may be several thousand degrees Kelvin, and the pressure several hundred atmospheres. In the presence of an electrical current, the dynamics of the cavitating bubbles can assist in the creation of a plasma state in a fluid.

In the electrolytic cell 100 of the preferred embodiment, the plasma acts a virtual electrode with a higher current density than the cathode electrode 110. The plasma virtual electrode, through thermolysis and/or electrolysis, produces hydrogen. By using the plasma virtual electrode, electrochemical changes at the cathode electrode 110 (such as corrosion) may be reduced.

Since the use of a high velocity fluid jet may enhance the rate of cooling and helps inhibit recombination of hydrogen with oxygen, the use of a cavitating jet 120 is preferred. Other suitable cavitating devices (such as a propeller) may, however, be substituted for the cavitating jet 120.

2. Cathodic Fluid Subsystem

Figure 2:
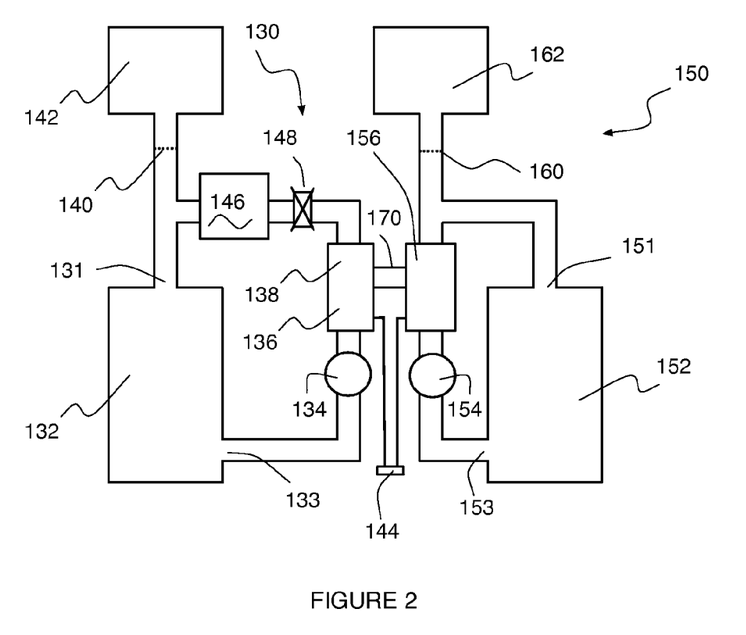
FIG. 2 is a representation of the electrolytic cell with both the cathode fluid subsystem and the anode fluid subsystem.

As shown in FIGS. 1 and 2, the electrolytic cell 100 of the preferred embodiment further includes a cathodic fluid subsystem 130. The cathodic fluid subsystem 130 functions to recirculate the cathodic fluid through the electrolytic cell 100 and, while not necessary to the functionality of the electrolytic cell 100, improves the efficiency of the electrolytic cell 100. The cathodic fluid subsystem 130 preferably includes a cathodic fluid, a cathodic fluid reservoir 132, a pump 134, the cavitating jet 120, a cathodic fluid plenum 136, and a cathodic fluid chamber 138.

The cathodic fluid functions as the electrolyte for the production of hydrogen. The cathodic fluid is preferably an aqueous solution. The cathodic fluid may, however, function as the source for the production of other products and may include a range of aqueous fluids, oils, and/or slurries. The aqueous solution preferably includes either an acid (for example sulphuric acid) or a fine metal powder (for example magnesium, titanium, aluminum or iron) to react or combine with, and therefore remove, the oxygen. The aqueous solution preferably includes a small amount of potassium or other salt to enhance conductivity and to act as a buffer for hydroxides.

The cathodic fluid reservoir 132 functions to contain the cathodic fluid before the cathodic fluid flows through the cavitating jet 120. The cathodic fluid reservoir 132 is preferably a relatively large tank, but may be indistinguishable from other pipes or conduits in the cathodic fluid subsystem 130. The cathodic fluid reservoir 132 preferably includes an inlet 131 and an outlet 133. The pump 134, which is preferably located between the outlet 133 of the cathodic fluid reservoir 132 and the cavitating jet 120, functions to increase the pressure of the cathodic fluid on an upstream side of the cavitating jet 120. The pump 134 is preferably an electric pump 134, having approximately 5 horsepower, but any pump may be used including pumps directly driven from a mechanical source such as wind, hydraulic or wave power, or from an internal combustion engine. The cathodic fluid plenum 136, which is located between the hydraulic pump 134 and the cavitating jet 120, functions to contain the cathodic fluid at a suitable pressure to drive the cavitating jet 120. Operating pressure in the cathodic fluid plenum 136 is preferably between 1000 and 5000 pounds per square inch (psi), but other pressures may be used depending on the design of the cavitating jet 120, and other aspects of the electrolytic cell 100.

The cathodic fluid chamber 138, which is located on a downstream side of the cavitating jet 120, functions to contain a portion of the cathodic fluid and facilitate cavitation of the cathodic fluid. The throat 122, the nozzle 124, and the cathodic fluid chamber 138 preferably cooperate to cavitate the cathodic fluid through a venturi effect and/or a shearing effect of the high-velocity fluid exiting the nozzle 124 against the relatively static fluid within the cathodic fluid chamber 138. In both cases, the pressure of a volume of the cathodic fluid drops below the vapor pressure of the cathodic fluid, thereby cavitating the cathodic fluid. The pressure in the cathodic fluid plenum 136 is preferably 1000 to 2000 psi greater than the pressure in the cathodic fluid chamber 138, which facilitates the cavitation. When the cavitation bubbles in the cathodic fluid eventually collapse, shockwaves and heat are generated. The collapse of the bubbles and the creation of the shockwaves preferably occurs at a distance from the walls of the cathodic fluid chamber 138 to minimize damage to the cathodic fluid chamber 138.

Figure 3:
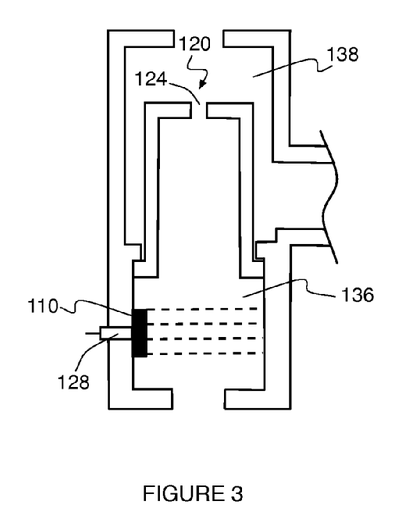
FIG. 3 is a representation of a second version of the cathode electrode.

In a preferred version, as shown in FIG. 1, the cathode electrode 110 is located near or adjacent the cavitating jet 120. The cathode electrode 110 is preferably coaxially located within a portion (such as the throat 122) of the cavitating jet 120 on the upstream side of the nozzle 124. The cathode electrode 110 preferably includes an electrically insulating sleeve 126. The cathode electrode 110 is connected to the electrical potential by a feedthrough 128 that allows the cathode electrode 110 to be energized without loss of fluid pressure within the cathodic fluid plenum 136. The cathode electrode 110 is preferably made from tungsten, palladium, platinum, titanium, or other suitable conductor including iridium oxide or conductive polymers. In an alternative version, as shown in FIG. 3, the cathode electrode no is located within the cathodic fluid plenum 136 at a distance from the cavitating jet 120. The cathode electrode no may be mounted on an interior wall of the cathodic fluid plenum 136. The cathode electrode no preferably includes a relatively high surface area. The cathode electrode 110 is connected to the electrical potential by a feedthrough 128 that allows the cathode electrode 110 to be energized without loss of fluid pressure within the cathodic fluid plenum 136. The cathode electrode no is preferably made from a nano-textured surface such as titanium nitride, platinum black, or iridium oxide (which as an electrode is an efficient charge injector). In other alternative versions, the cathode electrode may be located in any suitable location. In each of these versions, preferably very little—if any—electrolysis occurs directly at the cathode electrode 110. Rather, electrical current flows from the cathode electrode no into the cathode fluid in the cathodic fluid chamber 138. When the electrical current reaches the orifice of the cavitating jet 120, the electrical current density increases in roughly the same space that the high-pressure fluid is creating a cavitating jet 120 (in the upper part of the cathodic fluid chamber 138). The cavitating jet 120 preferably provides good conditions for the high electrical current density to create a plasma that facilitates electrolysis and hydrolysis. The advantage of this configuration is that there is less erosion of the cathode electrode 110 than in designs where the cathode electrode 110 is the site of plasma formation.

In a preferred embodiment, as shown in FIG. 2, the cathodic fluid subsystem 130 further includes a gas/liquid separator 140. The gas/liquid separator 140 functions to direct a gas portion (preferably hydrogen gas) to a storage tank 142, while directing a liquid portion (preferably the remaining cathodic fluid) to the inlet 131 of the cathodic fluid reservoir 132. Pressure may be regulated by transferring the gas from the storage tank 142 to an additional storage tank (not shown) when the pressure in the storage tank 142 exceeds a target pressure. Preferably, the gas/liquid separator 140 is a hydrogen permeable filter that only allows hydrogen to pass to the storage tank 142. Hydrogen permeable filters may be made of thin metal foils (such as palladium) sandwiched between porous ceramic holding plates. Alternatively, the gas/liquid separator 140 is any other suitable method or device that separates the mixture of gas and liquid from the cathodic fluid chamber 138 into a gas and a liquid.

In the preferred embodiment, the cathodic fluid subsystem 130 further includes a controller 144. The controller 144, which is connected to the pump 134, functions to regulate the cavitation of the cathodic fluid. The controller 144 preferably monitors the pressure of the cathodic fluid in the cathodic fluid plenum 136 through an electronic pressure monitor mounted to the cathodic fluid plenum 136 (for example the FP2000 series transducers from RDP Electronics, LTD). The cavitating jet requires a particular pressure range (approximately 1000 to 2000 psi in the preferred embodiment) to cavitate the cathodic fluid. The controller 144 adjusts the voltage going to the pump 134 until the pressure in the cathodic fluid plenum 136 is in the correct range for the cavitating jet to cavitate the cathodic fluid.

In the preferred embodiment, the cathodic fluid subsystem 130 further includes a heat exchanger 146. The heat exchanger 146 functions to transfer heat from the mixture of steam, cathodic fluid, hydrogen, and other gases from the cathodic fluid chamber 138 to a target fluid. The heat exchanger 146 may also function to cause the steam to condense. The heat exchanger 146 is preferably located adjacent or surrounding the cathodic fluid chamber 138, but may be located or arranged in any suitable location or manner to transfer heat from the cavitated cathodic fluid. Preferably, the target fluid to which the heat is transferred is water. The water is preferably stored in a target fluid reservoir (not shown). The heat exchanger 146 may simply be a coil of copper tubing installed inside the cathodic fluid chamber 138 through which the target fluid is induced to flow by the action of a pump or any other suitable device or method. The heat exchanger 146 may include any other suitable method or device. Although the heat exchanger 146 preferably transfers heat to water, the target fluid may be any other suitable fluid, mixture, or slurry. In one example, a target fluid having a low vapor pressure may be employed such that the heated target fluid is boiled and the resultant gas may be used to drive a turbine or for other mechanical work. In another example, the target fluid may be a gas, for example room air if the device is used to heat air directly. The controller 144, which functions to regulate the cavitation of the cathodic fluid, may also function to regulate the temperature of the target fluid in the target fluid reservoir. The controller 144 may monitor the temperature of the target fluid through an electronic thermometer mounted to the target fluid reservoir (for example the Model 1500 series transducers from Spectre Sensors, Inc.).

In the preferred embodiment, the cathodic fluid subsystem 130 further includes means for pressurizing the contents of the cathodic fluid chamber 138, which functions to modify the cavitation process. The pressurizing means is preferably independent of the cavitating jet. The pressurizing means preferably includes a valve 148 adapted to adjust the pressure of the cathodic fluid in the cathodic fluid chamber (on the downstream side of the cavitating jet). The valve 148 is a preferably a variable valve 148 located between the cathodic fluid chamber 138 and the liquid/gas separator 140. With the variable valve 148 completely open, the pressure in the cathodic fluid chamber 138 would be relatively low. With the variable valve 148 partially closed (which increases the flow resistance out of the cathodic fluid chamber 138), the pressure in the cathodic fluid chamber 138 could be increased and adjusted. The variable valve 148 creates a pressure differential between the cathodic fluid chamber 138 and the remaining portion of the cathodic fluid subsystem 130. The controller 144 may also monitor the pressure of the cathodic fluid in the cathodic fluid chamber 138 through an electronic pressure gauge mounted to the cathodic fluid chamber 138. The controller 144 preferably adjusts the variable valve 148 to increase or decrease the pressure within the cathodic fluid chamber 138 to achieve a target pressure. In alternative embodiments, the means for pressurizing the contents of the cathodic fluid chamber 138, which functions to generate further cavitation, may be accomplished with any other suitable device or method. For example, a pump may be coupled to the cathodic fluid chamber 138 and arranged to increase pressure in the cathodic fluid chamber 138.

3. Anodic Fluid Subsystem

As shown in FIGS. 1 and 2, the electrolytic cell 100 of the preferred embodiment further includes an anodic fluid subsystem 150 and a communicating chamber 170. The anodic fluid subsystem 150 functions to recirculate an anodic fluid through the electrolytic cell 100 and, while not necessary to the functionality of the electrolytic cell 100, clears the anode electrode 115 of bubbles and improves the efficiency of the electrolytic cell 100. The communicating chamber 170, which is located along the electrical path, functions to allow electrical current flow between the cathode electrode no and the anode electrode 115.

The anodic fluid subsystem 150 preferably includes an anodic fluid, an anodic fluid reservoir 152, a pump 154, and an anodic fluid chamber 156. The anodic fluid functions as the electrolyte for the production of oxygen. The anodic fluid may be the same fluid as the cathodic fluid, or may be a different fluid than the cathodic fluid. The anodic fluid may have the same additives as the cathodic fluid, or may have different additives than the cathodic fluid. The anodic fluid reservoir 152 functions to contain the anodic fluid. The anodic fluid reservoir 152 is preferably a relatively large tank, but may be indistinguishable from other pipes or conduits in the anodic fluid subsystem 150. The anodic fluid reservoir 152 preferably includes an inlet 151 and an outlet 153. The pump, which is preferably located between the outlet 153 of the anodic fluid reservoir 152 and the anodic fluid chamber 156, functions to move the anodic fluid through the anodic fluid subsystem 150. The pump 154 is preferably an electric pump 154, but any pump 154 may be used including pumps directly driven from a mechanical source such as wind, hydraulic or wave power, or from an internal combustion engine. The anodic fluid chamber 156, which is located on a downstream side of the pump 154, functions to contain a portion of the anodic fluid.

In the preferred embodiment, the anodic fluid subsystem 150 further includes a gas/liquid separator 160. The gas/liquid separator 160 functions to direct a gas portion (preferably oxygen gas) to a storage tank 162, while directing a liquid portion (preferably the remaining anodic fluid) to the inlet 151 of the anodic fluid reservoir 152. Pressure may be regulated by transferring the gas from the storage tank 162 to an additional storage tank (not shown) when the pressure in the storage tank 162 exceeds a target pressure. Pressure in the oxygen storage tank 162 is preferably regulated to be the same (or close to the same) as the pressure in the hydrogen storage tank 142. Preferably, the gas/liquid separator 160 is an gas permeable filter that only allows gas (preferably oxygen) to pass to the storage tank 162. Gas permeable filters may be made of polymer sheets sandwiched between porous ceramic holding plates. Alternatively, the gas/liquid separator 160 is any other suitable method or device that separates the mixture of gas and liquid from the anodic fluid chamber 156 into a gas and a liquid.

The communicating chamber 170, which is located along the electrical path, functions to allow electrical current flow between the cathodic fluid chamber 138 and the anodic fluid chamber 156. The communicating chamber 170 preferably includes a membrane 172. The membrane 172 functions to allow electrical current flow between the cathode electrode no and the anode electrode 115 and to substantially prevent fluid flow. The membrane 172, while not necessary to the functionality of the electrolytic cell 100, prevents the anode electrode 115 fluid and the cathode electrode 110 fluid from mixing and results in higher purity separation of oxygen and hydrogen. The membrane 172 may be made from Nafion or other proton exchange material, or it may simply be a semipermeable filter made from plastic, ceramic, or other suitable material.

In a first version, as shown in FIG. 1, the anodic fluid subsystem 150 does not include a cavitating jet. Since there is no cavitating jet, the pump of the anodic fluid subsystem (shown in FIG. 2) preferably does not create a large input-output differential and the pump is preferably approximately ⅛th horsepower. The anode electrode 115 may be mounted on an interior wall of the anodic fluid chamber 156. The anode electrode 115 preferably includes a relatively high surface area. The anode electrode 115 is connected to the electrical potential by a feedthrough 117 that allows the anode electrode 115 to be energized without loss of fluid pressure within the anodic fluid chamber 156. The anode electrode 115 preferably includes a stacked mesh structure, but may alternatively include a porous, sintered or sponge metal structure. The anode electrode 115 may be made from tungsten, palladium, platinum, titanium, or other suitable conductor including iridium oxide or a conductive polymer.

Figure 4:
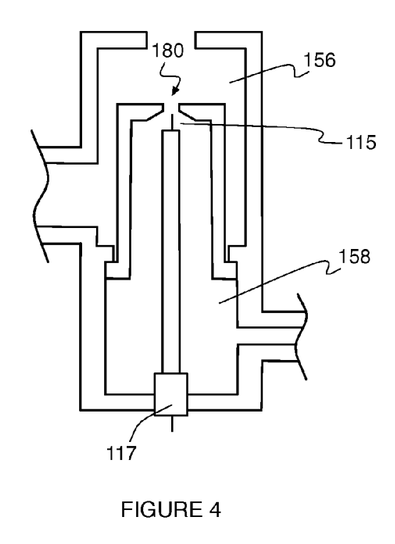
FIG. 4 is a representation of the second version of the anode electrode.
Figure 5:
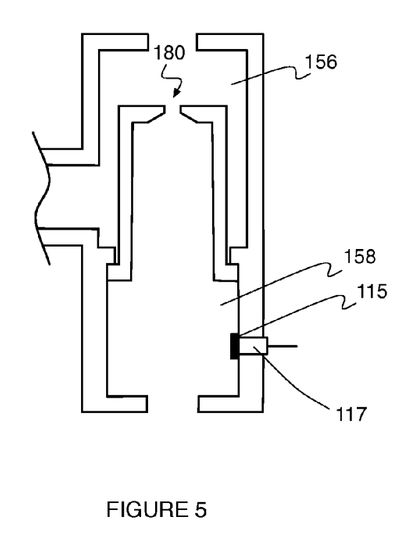
FIG. 5 is a representation of the third version of the anode electrode.

In second and third versions, as shown in FIGS. 4 and 5, the anodic fluid subsystem 150 includes a cavitating jet 180 located along the electrical path between the cathode electrode no and the anode electrode 115. The cavitating jet 180 functions to cavitate the anodic fluid and to create a plasma state in anodic fluid. In the electrolytic cell 100 of these second and third versions, the plasma state of the cavitated anodic fluid acts as a virtual electrode with a higher current density than the anode electrode 115. The virtual electrode, through thermolysis and/or electrolysis, produces oxygen. By using the plasma virtual electrode, electrochemical changes at the anode electrode 115 (such as plating) may be reduced. The pump 154, in these second and third versions, functions to increase the pressure of the anodic fluid on an upstream side of the cavitating jet 180. In a manner similar to the cavitating jet 120 of the cathodic fluid subsystem 130, the anodic fluid subsystem 150 further includes a plenum 158. The plenum 158, which is located between the pump 154 and the cavitating jet 180, functions to contain the anodic fluid at a suitable pressure to drive the cavitating jet 180. Operating pressure in the plenum 158 is preferably between 1000 and 5000 pounds per square inch (psi), but other pressures may be used depending on the design of the cavitating jet 180, and other aspects of the electrolytic cell 100. The anodic fluid chamber 156, in the second and third versions, further functions to facilitate cavitation of the anodic fluid. In the second version, as shown in FIG. 4, the anode electrode 115 may be coaxially located within a portion of the cavitating jet 180 on the upstream side of the nozzle 124. In the third version, as shown in FIG. 5, the anode electrode may be mounted on an interior wall of the plenum 158. In other versions, the anode electrode may be located in any other suitable location.

In the preferred embodiment, the anodic fluid subsystem 150 of the preferred embodiment, like the cathodic fluid subsystem 130, may further includes a controller to regulate the cavitation of the anodic fluid, may include a heat exchanger to transfer heat from the mixture of steam, anodic fluid, oxygen, and other gases from the anodic fluid chamber to a target fluid, and may include means for pressurizing the contents of the anodic fluid chamber to generate further cavitation. The pressurizing means preferably includes a valve adapted to adjust the pressure of the anodic fluid on a downstream side of the nozzle.

In the preferred embodiment, both the cathodic fluid subsystem 130 and the anodic fluid subsystem 150 are mostly made from non-conductive materials to avoid interfering with the anode electrode 115 and cathode electrode no current flow that is required for the plasma to form and for electrolysis to occur.

As a person skilled in the art will recognize from the previous detailed description and from the figures and claims, modifications and changes can be made to the preferred embodiments of the invention without departing from the scope of this invention defined in the following claims.

I claim:

1. An electrolytic cell comprising:
   a first reservoir configured to contain a first volume comprising a first electrically conductive fluid;
   a first electrode fluidly coupled to the first reservoir;
   a second reservoir configured to contain a second volume comprising a second electrically conductive fluid;
   a second electrode fluidly coupled to the second reservoir;
   an electrical connection between the first and second reservoirs, configured to define an electrical path between the first and second electrodes;
   a cavitating jet located along the electrical path between the first and second electrodes and configured to cavitate a portion of the first fluid, distal the first electrode, within the first reservoir; and
   a plenum, fluidly coupled to the first reservoir, configured to contain a third volume comprising the first fluid, the third volume having a higher pressure than the first volume, wherein the first electrode is located within the plenum, and wherein the cavitating jet fluidly connects the plenum to the reservoir and facilitates first volume cavitation with the third volume pressure.

2. The electrolytic cell of claim 1 wherein the first and second electrodes are connected to an electrical potential.

3. The electrolytic cell of claim 2 wherein the first and second electrodes are connected to an electrical potential of approximately 200 to 800 volts and approximately 0.05 and 0.80 amps.

4. The electrolytic cell of claim 1 further comprising a pump fluidly coupled to the plenum and adapted to increase the pressure of the third volume; and a controller coupled to the pump and adapted to control the pressure of the third volume and thus the cavitation of the fluid.

5. The electrolytic cell of claim 1, wherein the first reservoir further comprises an outlet, the electrolytic cell further comprising a valve fluidly coupled to the fluid outlet and adapted to adjust the pressure of the fluid within the first reservoir.

6. The electrolytic cell of claim 5 further comprising a controller coupled to the valve.

7. The electrolytic cell of claim 1 further comprising a gas/liquid separator coupled to the reservoir outlet and adapted to direct a liquid portion of the first volume comprising the first fluid to the plenum.

8. The electrolytic cell of claim 7, further comprising a storage tank fluidly coupled to the gas/liquid separator, wherein the gas/liquid separator is further adapted to direct a gaseous portion of the first volume to the storage tank.

9. The electrolytic cell of claim 1 wherein the cavitating jet includes a nozzle adapted to increase the velocity of the fluid.

10. The electrolytic cell of claim 9 wherein the cavitating jet further includes a plurality of nozzles adapted to increase the velocity of the fluid.

11. The electrolytic cell of claim 1 wherein the first electrode is a cathode electrode, and the second electrode is an anode electrode.

12. The electrolytic cell of claim 1 further comprising a heat exchanger adapted to transfer heat from the fluid.

13. The electrolytic cell of claim 1 wherein the electrical connection comprises a fluid impermeable membrane adapted to allow electrical current flow between the first electrode and the second electrode and to substantially prevent fluid flow.

14. The electrolytic cell of claim 1, further comprising:
a second plenum fluidly coupled to the second reservoir and configured to contain a fourth volume comprising the second fluid, wherein the fourth volume has a higher pressure than the second volume, and wherein the second electrode is located within the second plenum;
a second cavitating jet, fluidly connecting the second plenum and the second reservoir, adapted to cavitate a portion of the second fluid within the second reservoir, distal the second electrode.

15. The electrolytic cell of claim 14, wherein the second reservoir further comprises an outlet, the electrolytic cell further comprising a second gas/liquid separator coupled to the outlet of the second reservoir and adapted to direct a liquid portion of the second volume, comprising the second fluid, to the second plenum.

16. The electrolytic cell of claim 15, further comprising a second storage tank fluidly coupled to the second gas/liquid separator, wherein the second gas/liquid separator is further adapted to direct a gas portion of the second volume, comprising the second fluid, to the second storage tank.

17. The electrolytic cell of claim 14 wherein the second electrode is coaxially located within a portion of the second cavitating jet.

18. The electrolytic cell of claim 1, wherein the second electrode is located on an interior wall of the second reservoir.

19. The electrolytic cell of claim 1, wherein the first and second fluid are the same aqueous solution, and wherein the first and second electrodes and the cavitating jet cooperate to initiate a plasma state in the aqueous solution that produces hydrogen through at least one of thermolysis and electrolysis.

20. An electrolytic cell comprising:
a reservoir configured to contain a first volume comprising an electrically conductive fluid;
a first electrode fluidly coupled to the reservoir;
a second reservoir configured to contain a second volume comprising a second electrically conductive fluid;
a second electrode fluidly coupled to the second reservoir;
an electrical connection between the first and second reservoirs, configured to define an electrical path between the first and second electrodes;
a cavitating jet located along the electrical path between the first and second electrodes and configured to cavitate a portion of the first fluid, distal the first electrode, within the first reservoir, the cavitating jet including a nozzle adapted to increase the velocity of the fluid, wherein a portion of the first electrode is coaxially located within the nozzle.

21. An electrolytic cell comprising:
an electrical subsystem including:
an electrode pair including a first electrode and a second electrode and defining an electrical path between the first electrode and the second electrode, wherein the electrode pair is connected to an electrical potential; and
a fluid subsystem including:
a reservoir including an inlet and an outlet and adapted to contain a fluid, a cavitating jet located along the electrical path between the first electrode and the second electrode and adapted to cavitate the fluid;
a pump coupled to the outlet of the reservoir and adapted to increase the pressure on the fluid;
a plenum coupled to the pump, located on an upstream side of the cavitating jet, and adapted to maintain the fluid at an increased pressure, wherein the first electrode is located within the plenum;
a chamber located on a downstream side of the cavitating jet and adapted to facilitate cavitation of the fluid; and
a gas/liquid separator coupled to the chamber and to the inlet of the reservoir and adapted to direct a liquid portion of the fluid to the inlet of the reservoir.

22. The electrolytic cell of claim 21 wherein the cathode first electrode is coaxially located within a portion of the cavitating jet.

23. The electrolytic cell of claim 21 further comprising a membrane located along the electrical path and adapted to allow electrical current flow between the first electrode and the second electrode and to substantially prevent fluid flow.

24. The electrolytic cell of claim 23 further comprising a second fluid subsystem including
a second reservoir including an inlet and an outlet and adapted to contain a second fluid, a second chamber coupled to the outlet of the second reservoir, and
a second gas/liquid separator coupled to the second chamber and to the inlet of the second reservoir and adapted to direct a liquid portion of the second fluid to the inlet of the second reservoir.

25. The electrolytic cell of claim 24 wherein the anode second electrode is located within the second chamber.

26. The electrolytic cell of claim 24 wherein the second fluid subsystem further includes
a second cavitating jet located along the electrical path between the first electrode and the second electrode and adapted to cavitate the second fluid,
a second pump coupled to the outlet of the second reservoir and adapted to increase the pressure on the second fluid, and
a second plenum coupled to the second pump, located on an upstream side of the second cavitating jet, and adapted to maintain the second fluid at an increased pressure, wherein the second chamber is coupled to the outlet of the reservoir on a downstream side of the second cavitating jet and adapted to facilitate cavitation of the second fluid.

27. The electrolytic cell of claim 26 wherein the second electrode is coaxially located within a portion of the second cavitating jet, and wherein the first electrode is coaxially located within a portion of the first cavitating jet.

28. An electrolytic cell comprising:
a reservoir configured to contain a first volume of an electrically conductive fluid;
a plenum configured to contain a second volume of the electrically conductive fluid, the second volume having a higher pressure than the first volume;

a first electrode disposed within the plenum;
a cavitating jet fluidly connecting the plenum and the reservoir, the cavitating jet configured to cavitate a portion of the first volume within the reservoir, distal the first electrode;
a second reservoir configured to contain a third volume of a second electrically conductive fluid;
a second electrode fluidly coupled to the second reservoir; and
an electrical connection between the first and second reservoirs, configured to define an electrical path between the first and second electrodes through the first and second reservoirs.

* * * * *

UNITED STATES PATENT AND TRADEMARK OFFICE
CERTIFICATE OF CORRECTION

| | |
|---|---|
| PATENT NO. | : 8,354,010 B2 |
| APPLICATION NO. | : 12/296526 |
| DATED | : January 15, 2013 |
| INVENTOR(S) | : Benjamin Pless |

It is certified that error appears in the above-identified patent and that said Letters Patent is hereby corrected as shown below:

Column 10, Lines 25 and 26, "the cathode first electrode" should read --the first electrode--.

Column 10, Lines 41 and 42, "the anode second electrode" should read --the second electrode--.

Signed and Sealed this
Twenty-sixth Day of February, 2013

Teresa Stanek Rea
*Acting Director of the United States Patent and Trademark Office*